(12) United States Patent
Gronowski

(10) Patent No.: US 6,403,747 B2
(45) Date of Patent: *Jun. 11, 2002

(54) PROCESS FOR PREPARATION OF BUTYL RUBBER USING ACTIVATED ALKYLALUMINUM HALIDES

(75) Inventor: Adam Gronowski, Sarnia (CA)

(73) Assignee: Bayer Inc., Sarnia (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/422,524

(22) Filed: Oct. 21, 1999

(30) Foreign Application Priority Data

Oct. 30, 1998 (CA) .............................. 2252295

(51) Int. Cl.$^7$ .................................. C08F 36/00
(52) U.S. Cl. ................. 526/335; 526/226; 526/348.2; 526/348.5; 526/348.6; 526/348.7
(58) Field of Search ............................... 526/226, 335, 526/348.2, 348.5, 348.6, 348.7

(56) References Cited

U.S. PATENT DOCUMENTS

| | | | |
|---|---|---|---|
| 2,772,255 A | 11/1956 | Ernst et al. | 260/85.3 |
| 2,844,569 A | 7/1958 | Green et al. | 260/85.3 |
| 3,361,725 A * | 1/1968 | Parker et al. | 260/85.3 |
| 4,564,647 A * | 1/1986 | Hayashi et al. | 523/211 |
| 5,527,870 A | 6/1996 | Maeda et al. | 526/348.7 |
| 5,668,232 A | 9/1997 | Langstein et al. | 526/189 |

FOREIGN PATENT DOCUMENTS

| | | | |
|---|---|---|---|
| CA | 1019095 | * | 6/1973 |
| CA | 1019095 | | 10/1977 |
| SU | 494391 | | 12/1975 |

OTHER PUBLICATIONS

J. Pol. Sci. A vol. 27, (month unavailable) 1989, pp. 107–124, Copolymerization of Isobutylene with 1,4$^{13}$C–Isoprene, Irving Kuntz and Kenneth D. Rose.

* cited by examiner

Primary Examiner—David W. Wu
Assistant Examiner—William K Cheung
(74) Attorney, Agent, or Firm—Joseph C. Gil; Noland J. Cheung

(57) ABSTRACT

A process for preparing a butyl polymer having a weight average molecular weight of at least about 400,000. The process comprises the step of contacting a $C_4$ to $C_8$ monoolefin monomers with a $C_4$ to $C_{14}$ multiolefin monomer at a temperature in the range of from about −100° C. to about +50° C. in the presence of an aliphatic hydrocarbon diluent and a catalyst mixture comprising a major amount of a dialkylaluminum halide, a minor amount of a monoalkylaluminum dihalide, and a minute amount of at least one of a member selected from the group comprising water, aluminoxane and mixtures thereof.

20 Claims, No Drawings

PROCESS FOR PREPARATION OF BUTYL RUBBER USING ACTIVATED ALKYLALUMINUM HALIDES

FIELD OF THE INVENTION

In one of its aspects, the present invention relates to an improved, catalytic, solution process for preparing butyl rubber polymers. More particularly, the present invention relates to such a process for preparing butyl rubber polymers with good isobutylene conversions, such polymers having weight average molecular weights of greater than 400,000 at polymerization temperatures of −100° C. to +50° C. in a readily controlled process enabling the use of low cost, inert, aliphatic hydrocarbon solvents.

BACKGROUND OF THE INVENTION

Almost all world production of butyl rubber utilizes methyl chloride as a diluent. Methyl chloride is not an ozone depleter and only a very small fraction of it occurring in the environment is the result of industrial processes. However, exposure to methyl chloride can cause injury to liver, kidneys and the central nervous system. The growing health concerns regarding methyl chloride stimulated the search for an alternative reaction medium in the process of manufacturing butyl rubber.

A process for manufacturing butyl rubber in a hydrocarbon solvent (e.g., hexane) is also useful in the preparation of halobutyl rubber since it eliminates the dissolving step and thus simplifies the whole halobutyl process.

Conventional prior art processes for preparing butyl rubber polymers in solution (solution butyl processes) chiefly employ aluminum trihalide catalyst systems, viz., those using aluminum trichioride, or aluminum tribrommide alone. For example see U.S. Pat. Nos. 2,844,569 and 2,772,255. These prior art procedures are not wholly satisfactory because they are performed at very low temperatures, e.g. −90° C. to −110° C. leading to high refrigeration costs during polymerization. At such low temperatures, polymer solutions have a very high viscosity and are difficult to handle. In addition, a high viscosity of a polymer solution causes a very low rate of heat transfer, and also poor and difficult catalyst dispersion.

Aluminum trichloride has the disadvantage of little or no solubility in many desirable hydrocarbon systems and is often introduced to the reaction feed as a solution in methyl chloride. Although aluminum tribromide is soluble in hydrocarbons, the use thereof can cause the undersirable formation of substantial amounts of very high molecular weight fractions—see U.S. Pat. No. 2,772,255 [Ernst et. al.].

Alkylaluminum dihalides are generally less reactive than the aluminum halides but offer the advantage of excellent hydrocarbon solubility. To enhance their reactivity, they are frequently used together with cocatalysts.

Canadian patent 1,019,095 [Scherbakova et al. (Scherbakova)] teaches an industrial process for manufacturing butyl rubber in solution. The catalyst system used in the process comprises an alkylaluminum halide (e.g., ethylaluminum sesquichloride (($C_2H_5$)$_2$AlCl.Cl$_2$AlC$_2$H$_5$)), with water or hydrogen sulfide as a co-catalyst, and isopentane as a solvent. Not many details are known about the process, which most probably takes place at −85° C. to −80° C., with a content of solids in solution at about 10 weight percent. Some of the drawbacks of this method are listed below.

A direct reaction between water and the Lewis acid is not possible due to a violent nature of this reaction and a substantial amount of water used per alkylaluminum halide. Hence, preparation of the catalyst species is a cumbersome step in the whole process and it can take several hours. Two ways of performing this are taught in Scherbakova.

One approach to prepare the catalyst is to introduce water into the solution of the alkylaluminum halide in a hydrocarbon solvent together with an inert gas which is circulated in the system "alkylaluminum halide solution—water" and is continuously saturated with water.

The alternative method is to introduce water into the solution of the alkylaluminum halide in a hydrocarbon solvent as part of crystal hydrates of mineral salts, e.g., $CuSO_4.5H_2O$. The reactions are then not as violent than when water is introduced directly.

In the hydrolysis reactions higher alkylaluminoxanes are formed, which are filtered out and the clear solution is used to initiate the polymerizations. This represents an additional complicating step in the whole procedure to prepare the active initiating species.

A disadvantage of the both above catalyst preparation methods, beside long duration, is that the activity of the catalyst changes with time as the hydrolysis progresses. This requires the use of analytical methods to monitor the progress of the hydrolysis. This is not a simple task since alkylaluminum compounds require a special careful analytical treatment.

U.S. Pat. No. 3,361,725 [Parker et al. (Parker)] teaches that mixtures of dialkylaluminum halides, e.g., dialkylaluminum chlorides, and monoalkylaluminum dihalides, e.g., monoalkylaluminum dichlorides (in which a latter component is present in small amounts) are effective solution butyl rubber catalysts, operate at the far more economical (higher) temperatures and form excellent high molecular weight rubbers. Usually, the butyl rubber polymerizations using the above catalyst mixtures are conducted at temperatures ranging from about −87° C. to −57° C., and preferably at temperatures of −79° C. to −68° C., with excellent results being achieved with temperatures at or near −73° C. at approximately atmospheric pressure.

The polymers are soluble in the unreacted monomers as well, so that relatively minor amounts of diluent can be used. Reasonably small quantities of diluent can be employed—e.g., from 0 to 50 vol. percent diluent based on total volume of monomer and saturated catalyst solvent. Usually, however, the concentration of diluent during polymerization ranges from 0 to 20 vol. percent. The ability to use small concentrations of diluent during polymerization constitutes an economic advantage. The diluents usually employed to conduct the solution butyl polymerization reactions are $C_5$ to $C_6$ normal, iso, and cyclo paraffinic hydrocarbons which are liquids at the reaction temperatures and pressures employed. Preferably the $C_5$ and $C_6$ normal paraffins are used—e.g., n-pentane and n-hexane.

The catalyst mixture consists of from about 2 to about 10 mole percent of the monoalkylaluminum dihalide and from about 90 to 98 mole percent of the dialkylaluminum monohalide. This facilitates achievement of the most advantageous combination of ease of polymerization coupled with catalyst efficiency and good temperature control over the polymerization reaction. This latter characteristic is a significant advantage of the method. On the other hand, the reaction times require from about 50 to 100 minutes within the preferred temperature range.

It would be useful to have a method allowing good temperature control to be maintained during polymerizations but with higher reaction rates and higher molecular weight rubber formed than with the use of the catalyst taught by Parker. This should make it possible to carry out polymerizations even at more economical (higher) temperatures than with the method taught by Parker, with the rubber still displaying desirable properties.

SUMMARY OF THE INVENTION

It is the object of the present invention to provide an improved method to manufacture solution butyl rubber.

Accordingly, the present process provides a process for preparing a butyl polymer having a weight average molecular weight of at least about 400,000, the process comprising the step of:

contacting a $C_4$ to $C_8$ monoolefin monomers with a $C_4$ to $C_{14}$ multiolefin monomer at a temperature in the range of from about $-100°$ C. to about $+50°$ C. in the presence of an aliphatic hydrocarbon diluent and a catalyst mixture comprising a major amount of a dialkylalumium halide, a minor amount of a monoalkylaluminum dihalide, and a minute amount of at least one of a member selected from the group comprising water, aluminoxane and mixtures thereof.

More specifically, the present invention is directed to the preparation of butyl rubber polymers having weight average molecular weights greater than 400,000 by reacting a $C_4$ to $C_8$ olefin monomer, preferably a $C_4$ to $C_8$ isomonoolefin with a $C_4$ to $C_{14}$ multiolefin monomer, preferably a $C_4$ to $C_{10}$ conjugated diolefin monomer, at temperatures ranging from $-100°$ C. to $+50°$ C., preferably from $-80°$ C. to $-20°$ C., in the presence of an aliphatic hydrocarbon diluent in which said polymers are soluble and a catalyst mixture comprising: (A) a major amount, e.g., 0.01 to 2.0 wt. percent of a dialkylaluminum halide, (B) a minor amount, e.g., 0.002 to 0.4 wt. percent of a monoalkylaluminum dihalide (the weight percent being based on the total of the polymerizable monomers present) with the monoalkylaluminum dihalide always representing no more than about 20 mole percent of the catalyst mixture (based on monohalide plus dihalide) and (C) minute amounts of water or aluminoxane purposely added to activate the catalyst.

DETAILED DESCRIPTION OF THE INVENTION

The present invention represents an improvement over the Parker process. The improvement comprises including in the catalyst mixture minute amounts of water or aluminoxane. This leads to higher reaction rates, higher molecular weights and also higher isoprene content in the rubber while maintaining a good temperature control over the polymerization reactions.

Thus, an aspect of the present process is based on employing a modified catalyst system, where the catalyst such as the one taught by Parker is activated by addition of minute amounts of water or aluminoxane directly to the catalyst solution. This leads to higher reaction rates, higher molecular weights and surprisingly also to higher isoprene content in the rubber while maintaining a good temperature control over the polymerization reactions.

As mentioned hereinabove, the present process relates to the preparation of butyl rubber polymers. The term "butyl rubber" as used throughout this specification is intended to denote polymers prepared by reacting a major portion, e.g., from about 70 to 99.5 parts by weight, usually 85 to 99.5 parts by weight of an isomonoolefin, such as isobutylene, with a minor portion, e.g., about 30 to 0.5 parts by weight, usually 15 to 0.5 parts by weight, of a multiolefin, e.g., a conjugated diolefin, such as isoprene or butadiene, for each 100 weight parts of these monomers reacted. The isoolefin, in general, is a $C_4$ to $C_8$ compound, e.g., isobutylene, 2-methyl-1-butene, 3-methyl-1-butene, 2-methyl-2-butene, and 4-methyl-1-pentene.

Suitable aliphatic hydrocarbon diluents which can be used in accordance with the present process include, but are not limited to, the following: $C_4$ to $C_8$ saturated aliphatic and alicyclic hydrocarbons, such as pentane, hexane, heptane, isooctane, methylcyclohexane, cyclohexane, etc. Preferably the $C_5$ to $C_6$ normal paraffins are used, e.g., n-pentane and n-hexane. The same saturated hydrocarbons serve as "solvent" for the catalyst mixture. The concentration of diluent during polymerization may range from 0 to about 50 volume percent, and more preferably from 0 to about 25 volume percent.

The catalyst mixture used in the present process comprises a mixture of from about 1 to about 20 mole percent of a monoalkylaluminum dihalide, from about 80 to to about 99 mole percent of a dialkylaluminum monohalide and minute amounts of water or aluminoxane. Usually the catalyst mixture will contain from about 1 to about 15 mole percent of the monoalkylaluminum dihalide and from about 85 to about 99 mole percent of the dialkylaluminum monohalide. Preferably, however, and in order to achieve the most advantageous combination of ease of polymerization coupled with catalyst efficiency and good temperature control over the polymerization reaction the catalyst mixture contains from about 2 to about 10 mole percent of the monoalkylaluminum dihalide and from about 90 to 98 mole percent of the dialkylaluminum monohalide.

Usually the dialkylaluminum monohalide employed in accordance with this invention will be a $C_2$ to $C_{16}$ low molecular weight dialkylaluminum monochloride, wherein each alkyl group contains from 1 to 8 carbon atoms. Preferably, $C_2$ to $C_8$ dialkylaluminum chlorides are used, wherein each alkyl group contains from 1 to 4 carbon atoms. Suitable exemplary preferred dialkylaluminum monochlorides which can be used in accordance with this invention include, but are not limited to, a member selected from the group comprising dimethylaluminum chloride, diethylaluminum chloride, di(n-propyl)aluminum chloride, diisopropylaluminum chloride, di(n-butyl)aluminum chloride, diisobutylaluminum chloride, or any of the other homologous compounds.

The monoalkylaluminum dihalides employed in accordance with the present process may be selected from the $C_1$ to $C_8$ monoalkylaluminum dihalides, and preferably are $C_1$ to $C_4$ monoalkylaluminum dihalides containing essentially the same alkyl groups as mentioned hereinabove in conjunction with the description of the dialkylaluminum monochlorides. Suitable exemplary preferred $C_1$ to $C_4$ monoalkylaluminum dihalides which can be employed satisfactorily in accordance with the present process include, but are not limited to, the following: methylaluminum dichloride, ethylaluminum dichloride, propylaluminum dichlorides, butylaluminum dichlorides, isobutylaluminum dichloride, etc.

An important feature of the present invention is that water is added directly to the catalyst mixture and the resulting heterogeneous solution is immediately used to start the polymerization reaction. Preferably, the molar ratio of alkylaluminum halides to water is from about 4:1 to about 30:1, more preferably from about 7:1 to about 12:1. When the amount of water used is in the preferred range, a direct reaction between water and a Lewis acid can take place (at least in the lab scale), unlike in the Scherbakova method where cumbersome and lengthy special treatment is required. This is possible because the amount of water used in the present process is about 10 times lower than in the Scherbakova method. Another feature distinguishing the present invention from the Scherbakova method is that, in the present process, a heterogeneous solution resulting from adding water to the Lewis acid is used while in the Scherbakova method, a filtration step is used and only the soluble portion from the catalyst solution is employed to initiate the reaction. Thus, the nature and activity of the initiating species resulting from the present invention and from the Scherbakova method most probably are different since it is known that the composition and the catalytic activity of the species resulting from reaction of water and alkylaluminum compounds depends on the preparation method and aging.

Alternatively, to increase the activity of the Parker catalyst, minute amounts of aluminoxanes are added instead of water. The aluminoxane component useful as a catalyst activator typically is an oligomeric aluminum compound represented by the general formula $(R^2—Al—O)_n$, which is a cyclic compound, or $R^2(R^2—Al—O)_nAlR^2_2$, which is a linear compound. In the general aluminoxane formula, $R^2$ is independently a $C_1$ to $C_{10}$ hydrocarbyl radical (for example, methyl, ethyl, propyl, butyl or pentyl) and n is an integer of from 1 to about 100. $R^2$ may also be, independently, halogen, including fluorine, chlorine and iodine, and other non-hydrocarbyl monovalent ligands such as amide, alkoxide and the like, provided that not more than 25 mol % of $R^2$ are non-hydrocarbyl as described here. Most preferably, $R^2$ is methyl and n is at least 4.

Aluminoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an aluminoxane. Generally, however prepared, the reaction of an aluminum alkyl with a limited amount of water yields a mixture of the linear and cyclic species, and also there is a possibility of interchain complexation (crosslinking). The catalytic efficiency of aluminoxanes is dependent not only on a given preparative procedure but also on a deterioration in the catalytic activity ("aging") upon storage, unless appropriately stabilized. Methylaluminoxane and modified methylaluminoxanes are preferred. For further descriptions, see, for example, one or more of the following United States patents:

| | | |
|---|---|---|
| 4,665,208 | 4,952,540 | 5,041,584 |
| 5,091,352 | 5,206,199 | 5,204,419 |
| 4,874,734 | 4,924,018 | 4,908,463 |
| 4,968,827 | 5,329,032 | 5,248,801 |
| 5,235,081 | 5,157,137 | 5,103,031 |

In the present invention, it is preferred that aluminoxane is added to the catalyst solution in such an amount that the reaction feed contains from about 0.01 to about 10 ppm, preferably from about 0.02 to about 4 ppm.

The application of the present process results in higher polymerization rates, higher molecular weights of the rubber (in particular, especially important weight average molecular weight) and higher isoprene content in the rubber. It has been unexpectedly observed that, when aluminoxanes are present in the reaction feed containing isobutylene, both the polymerization rates and the molecular weights of the resulting rubber will be higher. For example, the Russian patent SU 494,391 teaches that when aluminoxane is used as the catalyst in the polymerization of isobutylene in a hydrocarbon solvent, higher molecular weights are achieved but polymerization rates are lower than in the known art. On the other hand, in U.S. Pat. No. 5,527,870 [Langstein et al.], it is taught that, when the initiating system is composed of a functionalized hydrocarbon like methyl chloride or chloroethane plus aluminoxane, the polymerization of isobutylene in hydrocarbon solvents leads to higher molecular weights than those of the prior art at simultaneously elevated rates of conversion. It is a surprising result of the present invention that the amount of isoprene incorporated in the rubber is higher while polymerization rates are also higher and the polymer possesses higher molecular weights. Usually, in order to incorporate more isoprene in butyl rubber, more isoprene is needed in the reaction feed which results in lower reaction rates and lower molecular weights of the product. This is because in the copolymerization of isobutylene and isoprene, the diolefin dominates the chain breaking process (J. Pol. Sci. A, 27, (1989), 107–124). The above-mentioned combination of higher reaction rates, higher molecular weights, and higher isoprene content in the rubber achieved in the present process results in a very desirable scenario from the industrial point of view, especially when the temperature control over polymerization reactions remains good. This can allow to synthesize butyl rubber at more economical (higher) polymerization temperatures than using the conventional Parker catalyst.

Embodiments of the present invention. will be illustrated with reference to the following Examples, which should not be use to construe or limit the scope of the present invention.

EXAMPLE 1

To a 50 mL Erlenmeyer flask, 3.75 mL of distilled hexane, 4.62 mL $Et_2AlCl$ (1.0 M solution in hexanes) and 0.38mL $EtAlCl_2$ (1.0 M solution in hexanes) were added at room temperature forming a catalyst,solution.

To a 250 mL 3-neck reaction flask equipped with an overhead stirrer, 40 mL of isobutylene at −75° C. were added, followed by 8.0 mL hexane at room temperature and 1.2 mL isoprene at room temperature. The reaction mixture was cooled down to −75° C. and 1.8 mL of the catalyst solution was added to start the reaction.

The reaction was carried out in MBRAUN™ dry box under the atmosphere of dry nitrogen. The temperature changes during the reaction were followed by a thermocouple. After 20 minutes, the reaction was terminated by adding 5 mL of ethanol into the reaction mixture.

The polymer solution was poured on an aluminum tare lined with Teflon and the solvent and unreacted monomers were allowed to evaporate in a vacuum oven at 70° C.

The gravimetrically determined yield was 8.4 wt. percent, $M_n$=170, 100, $M_w$=394, 300, and isoprene content was 1.6 mol percent.

This example represents the conventional Parker method and is provided for comparitive purposes only.

EXAMPLE 2

The methodology of Example 1 was repeated except 10 $\mu l$ of water was added directly to the catalyst solution. After stirring, 1.8 mL of this solution containing suspended white particles was immediately used to start the reaction.

The polymer yield was 38.0 wt. percent, $M_n$=185, 000, $M_w$=585, 700 and isoprene content in the rubber was 1.9 mol percent.

EXAMPLE 3

The methodology of Example 1 was repeated except 15 μl of water was added directly to the catalyst solution. After stirring, 1.8 mL of this solution containing suspended white particles was immediately used to start the reaction.

The polymer yield was 53.4 wt. percent, $M_n$=121,000, $M_w$=514,100 and isoprene content in the rubber was 2.1 mol percent.

EXAMPLE 4

The methodology of Example 1 was repeated except 100 μl of methylaluminoxan (10 wt. percent solution in toluene) was added directly to the catalyst solution. After stirring, 1.8 mL of this homogeneous solution was immediately used to start the reaction.

The polymer yield was 37.4 wt. percent, $M_n$=159,900, $M_w$=551,100 and isoprene content in the rubber was 2.2 mol percent.

EXAMPLE 5

To a 50 mL Erlenmeyer flask, 3.75 mL hexane, 4.62 mL $Et_2AlCl$ (1.0 M solution in hexanes) and 0.38 mL $EtAlCl_2$ (1.0 M solution in hexanes) were added at room temperature forming a catalyst solution.

To a 250 mL 3-neck reaction flask equipped with an overhead stirrer, 40 mL of isobutylene at −60° C. were added, followed by 8.0 mL hexane at room temperature and 1.2 mL isoprene at room temperature. The reaction mixture was cooled down to −60° C. and 1.0 mL of the catalyst solution was added to start the reaction.

The reaction was carried out in MBRAUN™ dry box under the atmosphere of dry nitrogen. The temperature changes during the reaction were followed by a thermocouple. After 40 minutes, the reaction was terminated by adding 5 mL of ethanol into the reaction mixture.

The polymer solution was poured on an aluminum tare lined with Teflon and the solvent and unreacted monomers were allowed to evaporate in a vacuum oven at 70° C.

The gravimetrically determined yield was 12.5 wt. percent, $M_n$=184,900, $M_w$=385,100, and isoprene content was 1.6 mol percent.

This example represents the conventional Parker method and is provided for comparitive purposes only.

EXAMPLE 6

The methodology of Example 5 was repeated except 10 μl of water was added directly to the catalyst solution. After stirring, 1.0 mL of this solution containing suspended white particles was immediately used to start the reaction.

The polymer yield was 26.1 wt. percent, $M_n$=197,600, $M_w$=468,200 and isoprene content in the rubber was 1.9 mol percent.

EXAMPLE 7

The methodology of Example 5 was repeated except 175 μl of methylaluminoxane (10 wt. percent solution in toluene) was added directly to the catalyst solution. After stirring, 1.0 mL of this homogeneous solution was immediately used to start the reaction.

The polymer yield was 19.7 wt. percent, $M_n$=203,000, $M_w$=550,400 and isoprene content in the rubber was 2.3 mol percent.

The temperature control in all above reactions was good.

What is claimed is:

1. A process for preparing a butyl polymer having a weight average molecular weight of at least about 400,000, the process comprising the step of:

contacting a $C_4$ to $C_8$ monoolefin monomer with a $C_4$ to $C_{14}$ multiolefin monomer at a temperature in the range of from about −100° C. to about +60° C. in the presence of an aliphatic hydrocarbon diluent and a catalyst mixture comprising 80 to about 99 percent of a dialkylaluminum halide, from about 1 to about 20 mole percent of a monoalkylaluminum dihalide, and at least one component selected from water, aluminoxane or mixtures thereof.

2. A process for preparing a butyl polymer according to claim 1, wherein the amount of water added to the catalyst solution is such that the total water content is from 2 to 100 ppm.

3. A process for preparing a butyl polymer according to claim 1, wherein the amount of aluminoxane added to the catalyst solution is such that the content of aluminoxane is from 0.01 ppm to 10 ppm.

4. The process defined in claim 2, wherein water is added directly to the catalyst solution and the resulting solution containing suspended white particles is used directly to initiate polymerization reactions.

5. The process defined in claim 3, wherein aluminoxane is added directly to the catalyst solution and the resulting homogeneous solution is used directly to initiate polymerization reactions.

6. The process defined in claim 1, wherein the diluent is a $C_4$ to $C_8$ saturated aliphatic hydrocarbon.

7. The process defined in claim 1, wherein the $C_4$ to $C_8$ monoolefin is an isomonoolefin.

8. The process defined in claim 1, wherein the $C_4$ to $C_{14}$ multiolefin is a $C_4$ to $C_{10}$ conjugated diolefin.

9. The process defined in claim 1, wherein from about 0.01 to about 2.0 wt. percent of the dialkylaluminum halide is employed, based on the total weight of said monomers present.

10. The process defined in claim 1, wherein from about 0.002 to about 0.4 wt. percent of the monoalkylaluminum dihalide is employed, based on the total weight of said monomers present.

11. The process defined in claim 1, wherein the amount of water is from 2 to 100 ppm.

12. The process defined in claim 1, wherein the amount of aluminoxane is from 0.01 to 10 ppm.

13. The process defined in claim 1, wherein the temperature is in the range of from about −80° C. to about −20° C.

14. A process for producing a solution butyl rubber polymer having a weight average molecular weight of at least about 400,000, the process comprising the step of:

reacting a $C_4$ to $C_8$ isomonoolefin with a $C_4$ to $C_{10}$ conjugated diolefin at a temperature in the range of from about −80° C. to about −20° C. in the presence of a $C_4$ to $C_8$ paraffinic diluent and a catalyst mixture comprising: (i) from about 85 to about 99 mol percent of a $C_2$ to $C_{16}$ dialkylaluminum halide component wherein each alkyl group contains from 1 to 8 carbon atoms; (ii) from about 1 to about 15 mol percent of a $C_1$ to $C_8$ monoalkylaluminum dihalide component wherein each alkyl group contains from 1 to 8 carbon atoms, and (iii) water in an amount of from about 2 to about 100 ppm of the total reaction feed.

15. A process for producing a solution butyl rubber polymer having a weight average molecular weight of at least about 400,000, the process comprising the step of:

reacting a $C_4$ to $C_8$ isomonoolefin with a $C_4$ to $C_{10}$ conjugated diolefin at a temperature in the range of from about −80° C. to about −20° C. in the presence of a $C_4$ to $C_8$ paraffinic diluent and a catalyst mixture comprising: (i) from about 85 to about 99 mol percent of a $C_2$ to $C_{16}$ dialkylaluminum halide component wherein each alkyl group contains from 1 to 8 carbon atoms; (ii) from about 1 to about 15 mol percent of a $C_1$ to $C_8$ monoalkylaluminum dihalide component wherein each alkyl group contains from 1 to 8 carbon atoms, and (iii) an aluminoxane in an amount of from about 0.01 to about 10 ppm of the total reaction feed.

16. The process defined in claim 14, wherein the dialkylaluminum halide is a $C_2$ to $C_8$ dialkylaluminum chloride wherein each alkyl group contains from 1 to 4 carbon atoms.

17. The process defined in claim 15, wherein the dialkylaluminum halide is a $C_2$ to $C_8$ dialkylaluminum chloride wherein each alkyl group contains from 1 to 4 carbon atoms.

18. The process defined in claim 14, wherein the monoalkylaluminum halide is a $C_1$ to $C_4$ alkylaluminum dichloride.

19. The process defined in claim 15, wherein the monoalkylaluminum halide is a $C_1$ to $C_4$ alkylaluminum dichloride.

20. The process defined in claim 15, wherein the aluminoxane is methylaluminoxane.

* * * * *